United States Patent [19]

Noda et al.

[11] Patent Number: 5,048,045
[45] Date of Patent: Sep. 10, 1991

[54] AUTOMATIC PREIONIZATION PULSE LASER

[75] Inventors: Etsuo Noda, Fujisawa; Setsuo Suzuki, Yokohama; Osami Morimiya, Tokyo, all of Japan

[73] Assignee: Kabushiki Kaisha Toshiba, Kawasaki, Japan

[21] Appl. No.: 494,218

[22] Filed: Mar. 15, 1990

[30] Foreign Application Priority Data

Mar. 22, 1989 [JP] Japan .................................. 1-67685

[51] Int. Cl.$^5$ ............................................. H01S 3/097
[52] U.S. Cl. .......................................... 372/86; 372/5; 372/38
[58] Field of Search .......................... 372/38, 5, 86, 87

[56] References Cited

U.S. PATENT DOCUMENTS

| | | | |
|---|---|---|---|
| 4,085,386 | 4/1978 | Farish et al. | 331/94.5 PE |
| 4,534,035 | 8/1985 | Long | 372/86 |
| 4,555,787 | 10/1985 | Cohn et al. | 372/86 |
| 4,592,065 | 5/1986 | de Witte | 372/86 |
| 4,611,327 | 9/1986 | Clark et al. | 372/86 |
| 4,894,838 | 1/1990 | Kraft et al. | 372/86 |
| 4,905,250 | 2/1990 | Van Dijk | 372/86 |

OTHER PUBLICATIONS

Bishop et al., "Axial X-ray Preionized XeCl; Laser and Direct Comparision with UV Preionization Mode", Appl. Phys. Lett 47(10), Nov. 1985, pp. 1045-1047.
Tallman et al., "Determination of the Minimum X-Ray Flux for Effective Preionization of an XeCl Laser", Appl. Phys. Letter 42(2), Jan. 1983, pp. 149,151.
Kashiwabara, et al., "Discharge Properties of Formed-Ferrite Plasma Sources", J. Appl. Phys. 62(3), Aug. 1987, pp. 787-791.
Kashiwabara et al., "Ultraviolet Emission Spectra from Formed-Ferrite Plasma Sources", J. Appl. Phys. 63(8), Apr. 1988, pp. 2514-2516.
Clemens et al., "Amorphous Alloys Formed by Microsecond Current Pulses", Apply. Phys. Lett. 50(9), Mar. 1987, pp. 495-497.

*Primary Examiner*—Léon Scott, Jr.
*Attorney, Agent, or Firm*—Foley & Lardner

[57] ABSTRACT

An X-ray preionization pulse laser comprises a laser tube in which a pair of main electrodes are disposed to face each other. Pulse discharge between the main electrodes excites a laser medium, thereby obtaining laser oscillation. The laser has a sealed vacuum chamber in which a sliding discharge area is arranged. The sliding discharge area produces sliding discharge that generates X-rays for preionizing the laser medium before the main discharge occurs for laser oscillation.

20 Claims, 7 Drawing Sheets

AUTOMATIC PREIONIZATION PULSE LASER

BACKGROUND OF THE INVENTION

1. Field of the Invention

The present invention relates to pulse lasers such as an excimer laser, a halogen gas laser, a TEA-$CO_2$ laser, TEMA-$CO_2$ laser, and a metal vapor laser which excite a laser medium by pulse discharging and oscillate a laser beam by a resonator, and particularly to an X-ray preionization pulse laser having high laser oscillation efficiency.

2. Description of the Prior Art

Generally, the excimer laser, halogen gas laser, TEA-$CO_2$ laser, TEMA-$CO_2$ laser, metal vapor laser, etc., which excite a laser gas (a laser medium) to obtain laser oscillation employ a discharge excitation technique, except for large power lasers which employ an electron beam excitation technique.

Figure 1:
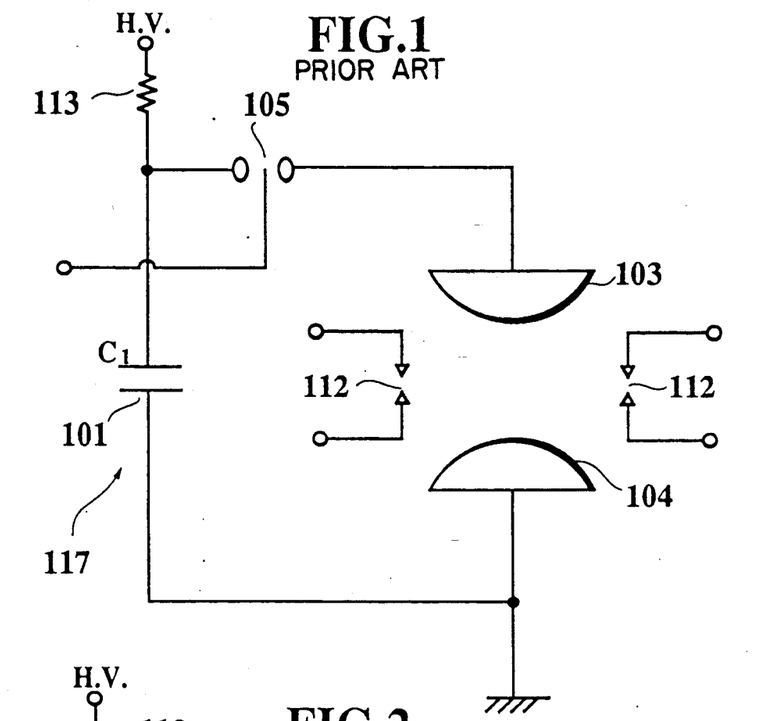
FIG. 1 is a circuit diagram showing the essential part of a discharge excitation pulse laser having separate driving circuits, according to a prior art.

FIG. 1 is a circuit diagram of a pulse laser employing the discharge excitation technique, according to the prior art.

This circuit has two main electrodes 103 and 104 disposed in a laser tube. The main electrodes 103 and 104 face each other and receive a pulse voltage to achieve pulse discharging for exciting a laser medium. To stabilize the laser medium excitation, it is necessary to preionize the laser medium. Usually, the preionization is carried out with ultraviolet rays generated by arc discharge from a plurality of spark gaps 112. The spark gaps 112 are driven by a pulse circuit that is different from a main electrode driving circuit 117.

The driving circuit 117 for the main electrodes 103 and 104 comprises a capacitor 101 ($C_1$), a trigger gap (a switch) 105, and a charging resistor 113. Discharge from the main electrodes 103 and 104 is carried out several tens to hundreds of nanoseconds after discharge from the spark gaps 112.

Figure 2:
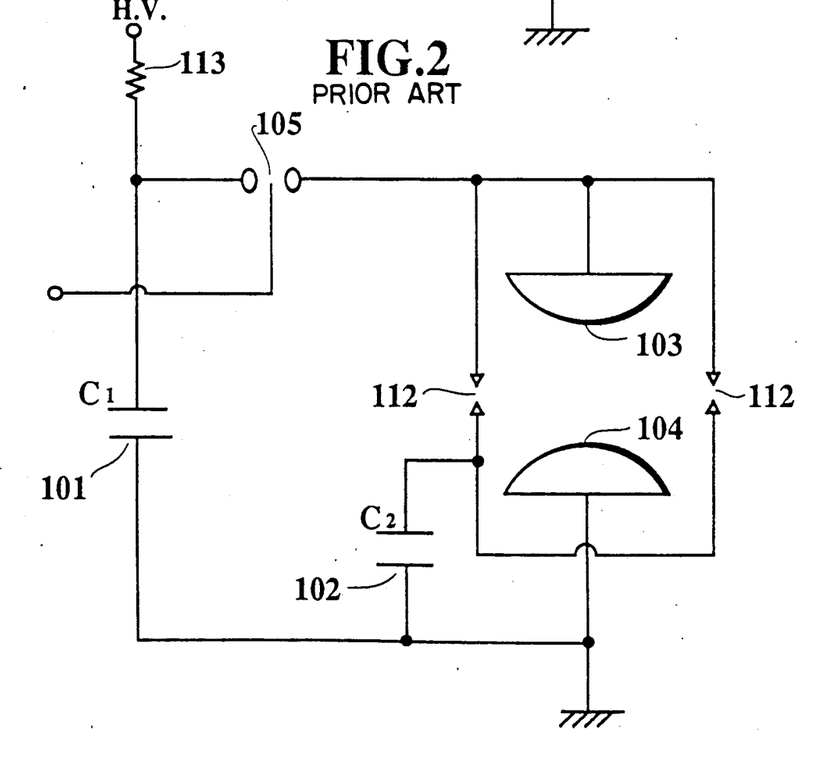
FIG. 2 is a circuit diagram showing the essential part of an automatic preionization pulse laser according to prior art.

FIG. 2 shows a conventional auto-preionization circuit for commonly causing the preionization discharge and main discharge. The operation of FIG. 2 will briefly be explained.

When a trigger gap (a switch) 105 is closed, a charge is transferred from a storage capacitor 101 ($C_1$) to a capacitor 102 ($C_2$) through preionization gaps 112, thereby charging the capacitor 102 ($C_2$). After a laser medium is preionized by preionization from the preionization gaps 112 and after the capacitor 102 ($C_2$) is sufficiently charged, main discharge between two main electrodes 103 and 104 is performed to oscillate a laser beam.

Generally, the capacitance of the capacitor $C_1$ and that of the capacitor $C_2$ are set to be $C_1 \geq C_2$.

To improve laser oscillation efficiency and stabilize discharging, it is necessary to sufficiently preionize the laser medium. The conventional technique involving ultraviolet rays generated by arc discharge from spark gaps is, however, incapable of sufficiently preionizing the laser medium, if the operating gas pressure for the main discharge is high or if the volume of the main discharge is too large. Namely, this conventional technique is not suitable for generating a strong laser beam. In addition, the speak gaps will be obstacles to gas flow, so that it may be difficult to operate at high repetition rates.

For large lasers, it is known to use an X-ray preionizes technique that preionize a laser medium with X-rays. The X-ray preionization technique can achieve sufficient preionization of the laser medium, even when the operating gas pressure for main discharge is high or even when the volume the main discharge is large. This technique employs, however, a separate power source for the preionization, in addition to a power source for the main discharge, thereby complicating the power source, enlarging the size and increasing the cost.

In contrast, the conventional preionization circuit utilizing ultraviolet rays generated by arc discharge from spark gaps cannot provide sufficient ultraviolet rays for preionizing a laser medium, thus demonstrating poor oscillation efficiency, unstable discharge, low laser output power, and low repetition rates. The conventional X-ray preionization circuit, on the other hand, has the problems of complicated power source and high cost.

SUMMARY OF THE INVENTION

To solve the above problems, an object of the present invention is to provide an X-ray preionization pulse laser realizing high laser oscillation efficiency and large output power.

Another object of the present invention is to provide a compact X-ray auto-preionization pulse laser having a simple structure and realizing sufficient preionization.

Still another object of the present invention is to provide an X-ray preionization pulse laser providing a high power output power and high repetition rate.

According to an aspect of the present invention, an X-ray preionization pulse laser comprises a laser tube in which a pair of main electrodes are disposed to face each other. Pulse discharge between the main electrodes excites a laser medium, thereby obtaining laser oscillation. The laser has a sealed vacuum chamber in which a sliding discharge area is arranged. The sliding discharge generates X-rays for preionizing the laser medium before the main discharge is accomplished for laser oscillation.

According to another aspect of the present invention, an X-ray preionization pulse laser comprises a laser tube in which a pair of main electrodes are disposed to face each other. Electrical discharge between the main electrodes excites a laser medium, thereby obtaining laser oscillation. A second capacitor $C_2$ is connected to the main electrodes in parallel. A first capacitor $C_1$, a switch, a X-ray generator and the second capacitor $C_2$ are connected in series. The first capacitor $C_1$ is firstly charged, and then the switch is closed to discharge the first capacitor $C_1$, so that the X-ray generator may generate X-rays for preionizing the laser medium. At this time, charges move from the first capacitor $C_1$ to the second capacitor $C_2$ to charge the second capacitor $C_2$, which applies a high voltage to the main electrodes, thereby achieving the pulse discharge between the main electrodes. The capacitance of the first capacitor $C_1$ and that of the second capacitor $C_2$ are set to be $C_1 < C_2$.

In this way, the first capacitor $C_1$ is charged to a high voltage in advance, and then the switch is closed, thus making the X-ray generating area (sliding discharge area) produce X-rays. At this time, charges move from the first capacitor $C_1$ to the second capacitor $C_2$, and the X-rays produced by the sliding discharge preionize the laser medium sufficiently. Thereafter, the second capacitor $C_2$ charged by the transfer of the electric charges causes the main discharge between anode and cathode. This excites the laser medium, thereby obtaining laser oscillation in a resonator. Since the capacitance of the second capacitor $C_2$ for the main discharging is set to be larger than that of the first capacitor $C_1$ for the preionization, a higher voltage is applied for the preionization, thereby generating high energy X-ray for preionizing the laser medium sufficiently.

These and other objects, features and advantages of the present invention will be more apparent from the following detailed description of preferred embodiments in conjunction with the accompanying drawings.

DETAILED DESCRIPTION OF THE EMBODIMENTS

Figure 3:
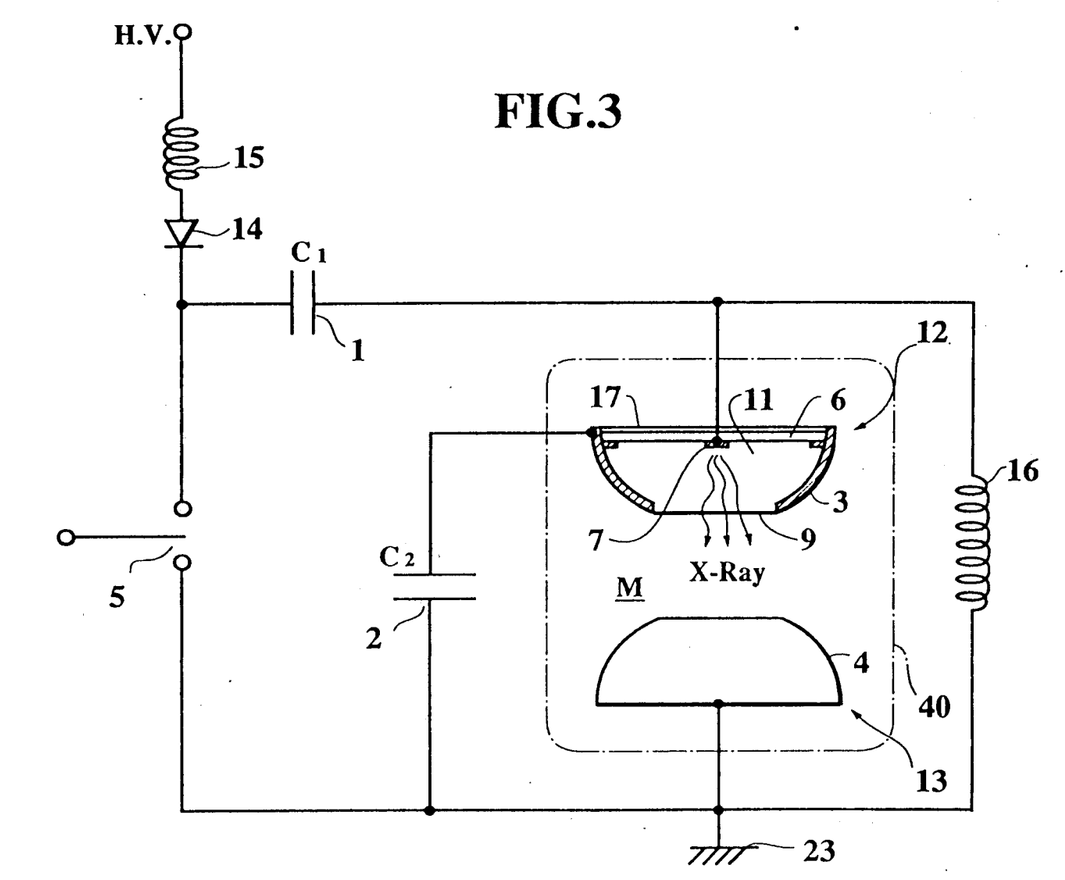
FIG. 3 is a circuit diagram with a sectional view of an electrode, showing an X-ray auto-preionization pulse laser according to a first embodiment of the invention.
Figure 4:
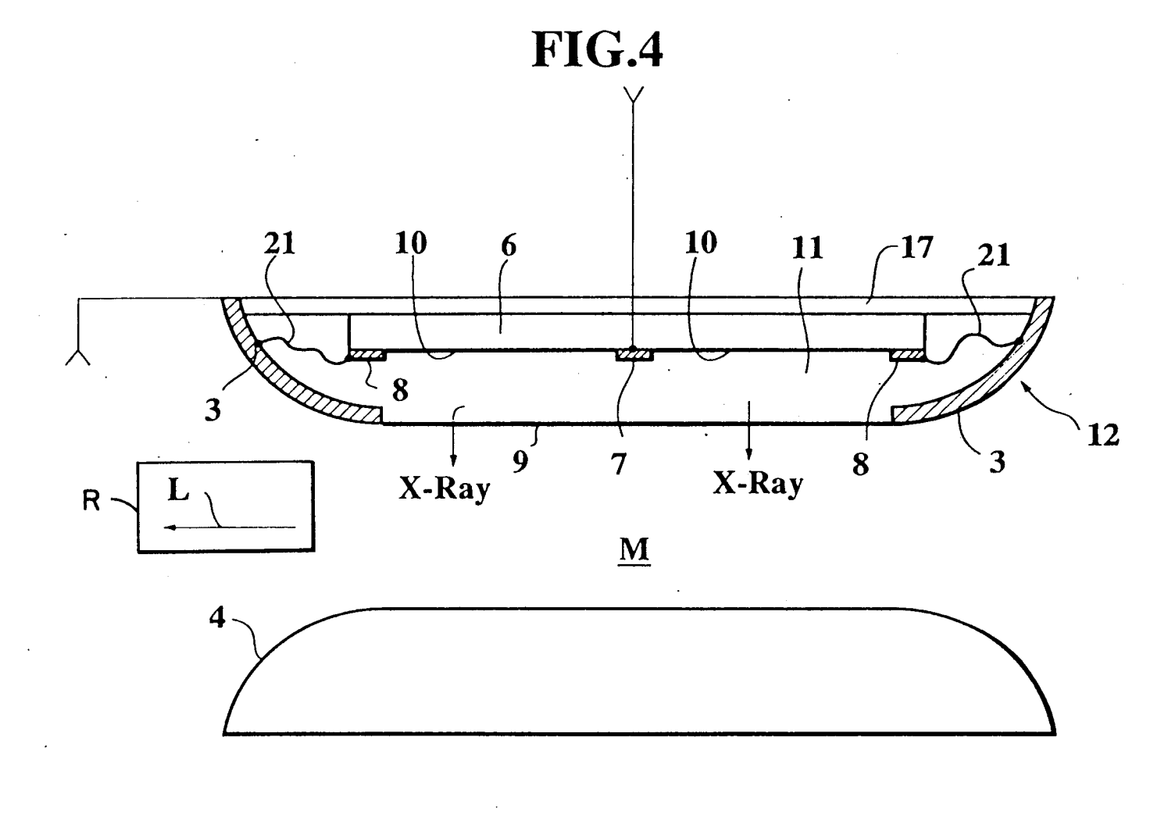
FIG. 4 is a sectional side view showing the details of a preionization area of the first embodiment.

FIGS. 3 and 4 shows an X-ray preionization pulse laser according to the first embodiment of the present invention.

The laser comprises a first electrode 12 including a main cathode 3 and sliding discharge electrodes 7 and 8, and a second electrode 13 including a main anode 4.

FIG. 4 shows the details of the first electrode 12 in which the cathode 3 having a curved shape is disposed on the periphery of a fitting member 17. The fitting member 17, main cathode 3, and a front face 9 define a sealed vacuum chamber 11. The front face 9 is made from a thin film which transmits X-rays.

In the sealed vacuum chamber 11, the fitting member 17 has a substrate 6 made of ferrite, etc. The sliding discharge electrodes 7 and 8 are disposed on the lower face of the substrate 6 such that the second sliding discharge electrodes 8 are spaced apart from each other in the longitudinal direction and arranged on each side of the first sliding discharge electrode 7.

Discharge channels 10 are formed between the first and second sliding discharge electrodes 7 and 8 on the surface of the substrate 6. The discharge channels 10 cause sliding discharge to produce X-rays for preionizing a laser medium. The substrate 6 is made of ferrite, ceramics, metal oxides, a composite of them, etc. To form the discharge channels 10 on the substrate 6, a part of the surface of the substrate 6 is heated rapidly and then cooled down rapidly by discharging, etc.

The first sliding discharge electrode 7 is connected to a high voltage source HV through a first capacitor 1 ($C_1$), a diode 14 and an inductance 15. The second sliding discharge electrodes 8 are connected to the main cathode 3 through electric wires 21 as shown in FIG. 4. The first and second sliding discharge electrodes 7 and 8 are connected to each other through the discharge channels 10, i.e., a sliding discharge portion.

The anode 4 is connected directly to a ground 23, while the cathode 3 is connected to the ground 23 through a second capacitor 2 ($C_2$). Namely, the one end of the second capacitor 2 ($C_2$) is connected to the cathode 3 and the other end of the second capacitor 2 ($C_2$) is connected to the anode 4 and the ground 23. The diode 14 is connected to the ground 23 through a switch 5. An inductance 16 is connected to the main electrodes 3 and 4 in parallel.

Consequently, the second capacitor 2 ($C_2$) is connected in parallel with the main electrodes 3 and 4, while the first capacitor 1 ($C_1$), switch 5, sliding discharge electrodes 7 and 8, main cathode 3, and second capacitor 2 ($C_2$) are connected in series.

The capacitance of the capacitor 1 ($C_1$) and that of the capacitor 2 ($C_2$) are set to be $C_1 < C_2$.

The operation of the first embodiment now will be explained.

The switch 5 is opened firstly to charge the first capacitor 1 ($C_1$) to a high voltage. Thereafter, the switch 5 is closed to discharge the first capacitor 1 ($C_1$). At this moment, the charge from the first capacitor 1 ($C_1$) is transferred through the first sliding discharge electrode 7, discharge channels 10, second sliding discharge electrodes 8, wires 21, and main cathode 3, to the second capacitor 2 ($C_2$). This transfer of the charge causes sliding discharge to occur on the surface of the substrate 6 made of ferrite, etc., thereby generating X-rays in the sealed vacuum chamber 11. The sliding discharge is oriented in the longitudinal direction of the main electrodes 3 and 4 and from the center toward both sides along the discharge channels 10.

The X-rays thus generated pass through the front face 9 and irradiate a main discharge region M, thereby preionizing the laser medium in the main discharge region M. The front face 9 is a thin film forming a partition wall of the sealed vacuum chamber 11. The second capacitor 2 ($C_2$) charged by the transfer of the electric charge causes main discharging to occur between the main cathode 3 and anode 4. This excites the laser medium (a laser gas), so that a resonator R may emit a laser beam in the direction of an arrow mark L, thus realizing laser oscillation.

It is known that preionization requires X-rays having an energy of 15 to 20 kV or over. It is also known that X-rays generated by an X-ray generator have an energy of one half to one third of a discharge voltage applied to the X-ray generator, which is, in this embodiment, the sliding discharge area, i.e., the discharge channels 10. These facts are true in both the sliding discharge system and accelerated electron beam system.

It is understood from these facts that a voltage of 30 to 40 kV or more must be applied to the X-ray generator (the discharge channels 10). On the other hand, a voltage applied to the main electrodes 3 and 4 is generally 20 to 30 kV, which is lower than the voltage applied to the X-ray generator (the discharge channels 10).

In the conventional auto-preionization circuit, however, the capacitors are set to be $C_1 \geq C_2$, so that a voltage applied to the X-ray generator is lower than a voltage applied to the main electrodes. This cannot realize the X-ray auto-preionization.

On the contrary, the capacitors of this embodiment are set to be $C_1 < C_2$, and therefore, a voltage applied to the X-ray generator (the discharge channels 10) is higher than a voltage applied to the main electrodes 3 and 4. This realizes the X-ray auto-preionization. Namely, while charges are transferred from the first capacitor 1 ($C_1$) to the second capacitor 2 ($C_2$), a voltage is applied to the sliding discharge electrodes 7 and 8 to generate X-rays from the discharge channels 10. This means that the voltage applied to the sliding discharge electrodes 7 and 8 is higher than the voltage thereafter applied to the main electrodes 3 and 4 by the second capacitor 2 ($C_2$) charged by the movement of the electric charges.

The X-ray generator may be disposed behind each of the main electrodes, or behind one of them. The X-ray generator may be arranged in a sealed vacuum chamber and in the vicinity of the main electrode(s).

Since the surface of the substrate 6 made of ferrite, etc., is treated in advance, the discharge channels 10 formed thereon realize easy discharge.

Also, it is possible to connect the second capacitor 2 ($C_2$) and the main electrodes 3 and 4 such that after charge from the first capacitor 1 ($C_1$) is transferred to the second capacitor 2 ($C_2$) with the sliding discharge, the charge from the second capacitor 2 ($C_2$) is transferred to the main electrodes 3 and 4 with another sliding discharge.

Figure 5:
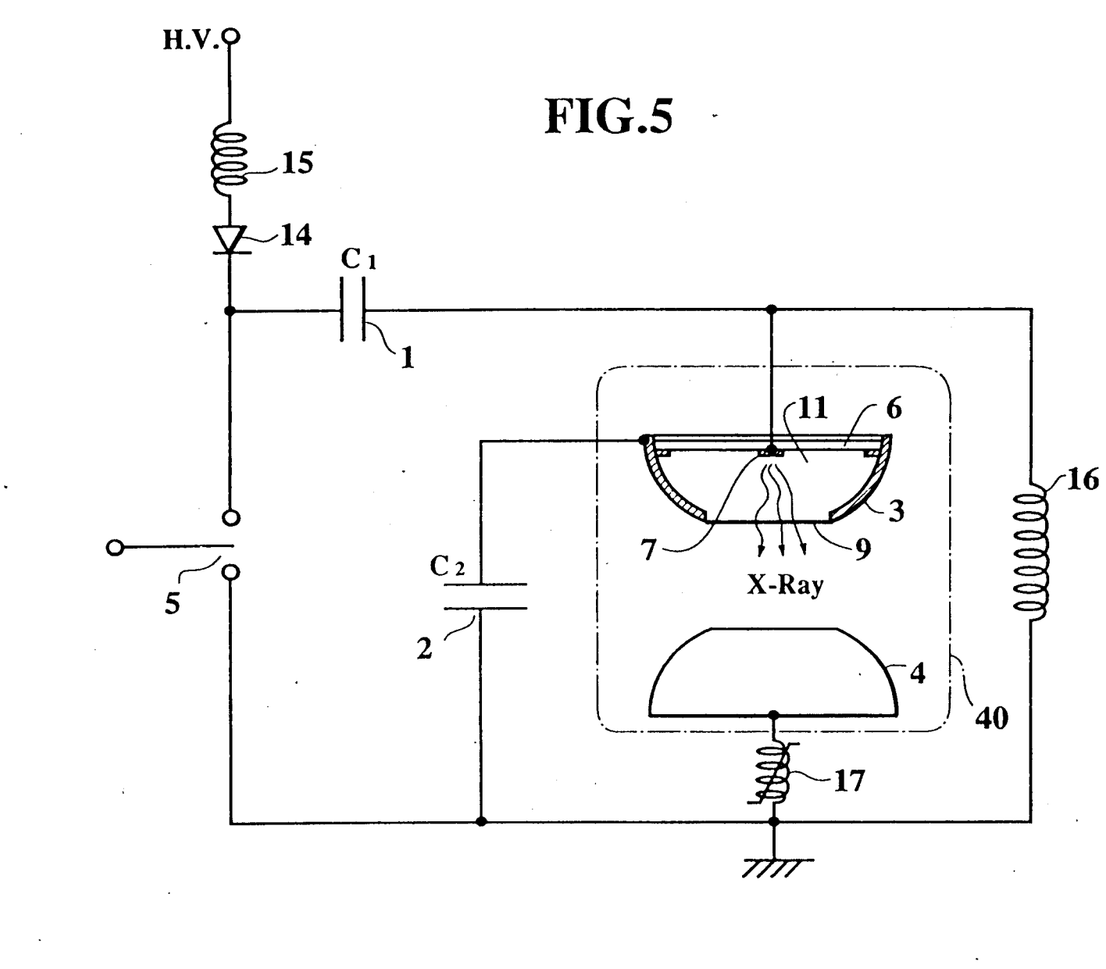
FIG. 5 is a circuit diagram showing the essential part of a modification of the first embodiment, involving a saturable inductance.

FIG. 5 is a view showing a modification of the first embodiment. In this modification, a saturable inductance 17 is inserted and connected between the second capacitor 2 ($C_2$) and anode 4 to obtain a fast rise time for the main discharge, thus further improving the laser oscillation efficiency.

The capacitance of the capacitor 1 ($C_1$) and that of the capacitor 2 ($C_2$) are set to be $C_1 < C_2$.

Figure 6:
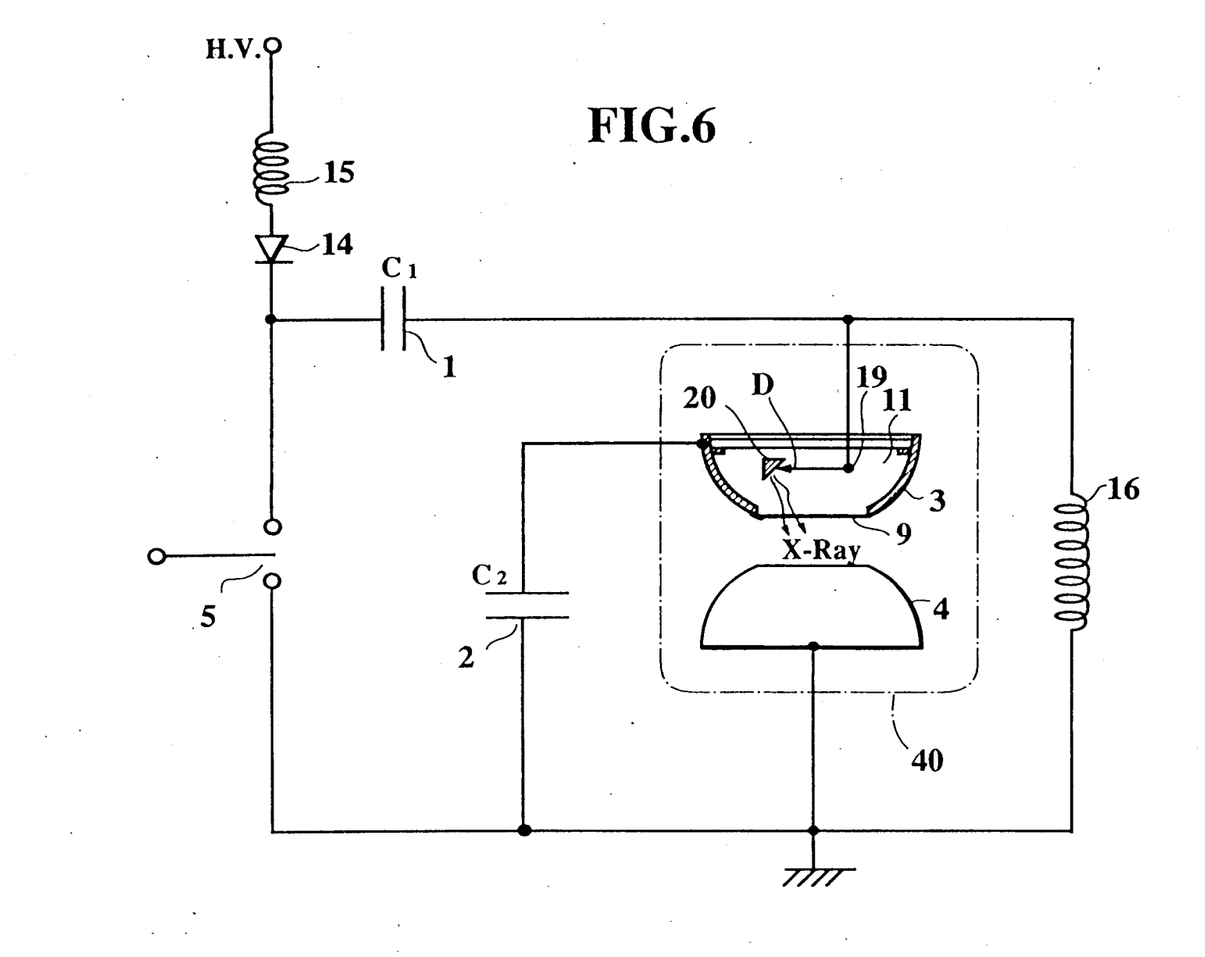
FIGS. 6 and 7 are circuit diagrams showing other modifications of the first embodiment, respectively.

FIG. 6 is a view showing another modification of the first embodiment. This modification has an electron beam source 19 behind the main cathode 3 in the sealed vacuum chamber 11. The electron beam source 19 emits electron beams, which are accelerated to a high speed in the direction of an arrow mark D and collide with a metal target 20, thereby generating braked X-rays. The remainder of the operation of this modification is the same as that of the first embodiment.

The capacitance of the capacitor 1 ($C_1$) and that of the capacitor 2 ($C_2$) are set to be $C_1 < C_2$.

Figure 7:
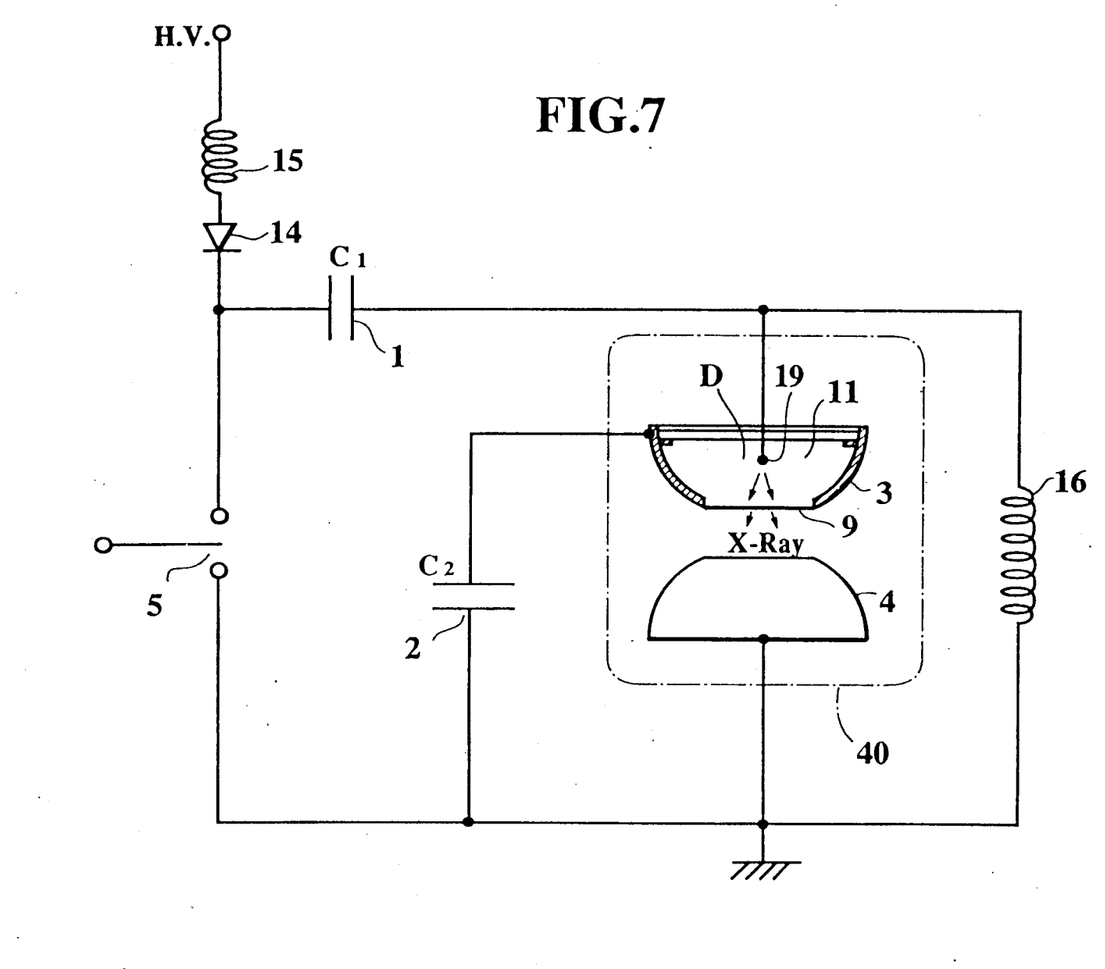

FIG. 7 is a view showing still another modification of the first embodiment. This modification uses the thin film 9 as a metal target with which an electron beam D provided by an electron beam source 19 collides.

The capacitance of the capacitor 1 ($C_1$) and that of the capacitor 2 ($C_2$) are set to be $C_1 < C_2$.

The electron beam source 19 of FIG. 6 or 7 may be a hot cathode, plasma cathode, or field emission cold cathode. The X-ray generator of FIG. 6 or 7 may be disposed behind each of the main electrodes or behind one of them. The X-ray generator may be disposed adjacent to the main electrode(s) in the sealed vacuum chamber.

Figure 8:
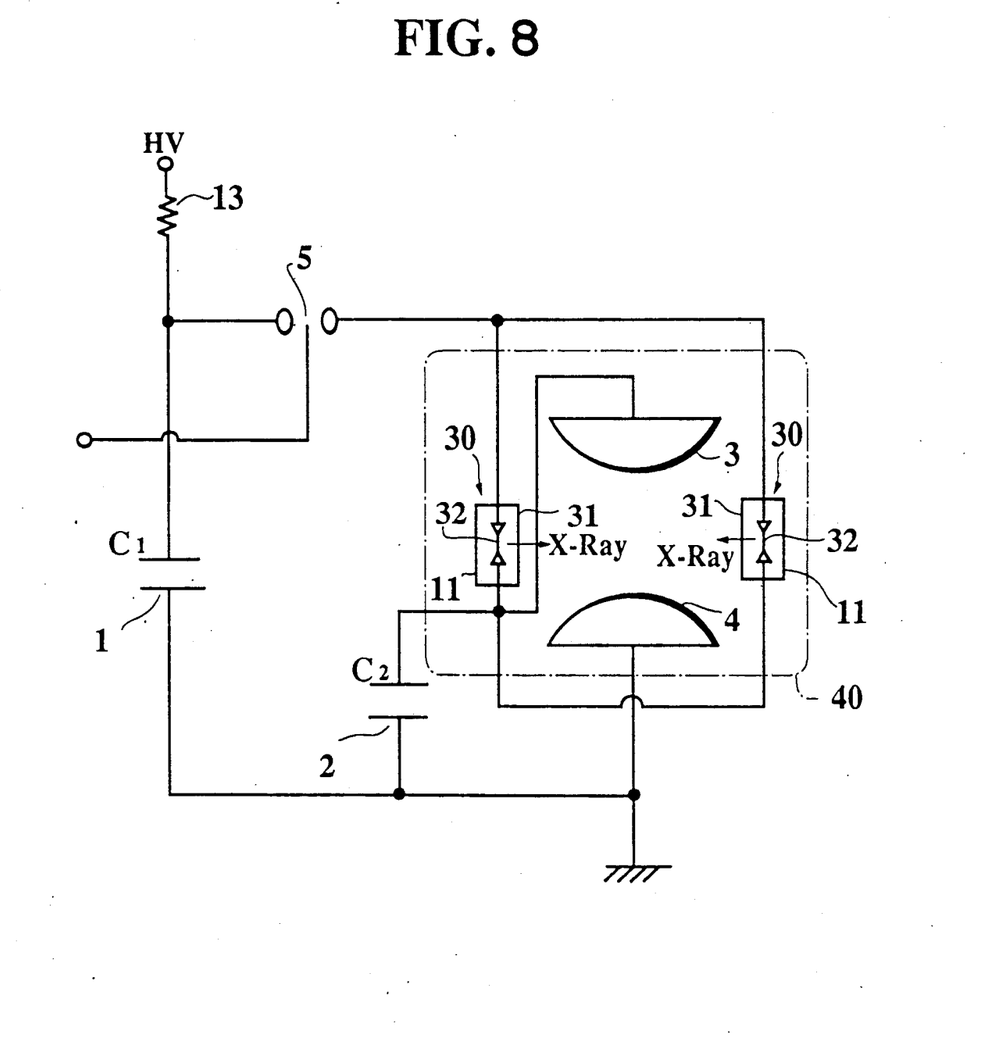
FIG. 8 is a circuit diagram showing an autopreionization pulse laser according to a third embodiment of the present invention.

FIG. 8 is a view showing another embodiment of the invention. According to this embodiment, sliding discharge channels 32 are disposed inside a sealed vacuum chamber 11 to form two X-ray generators 30 which are orthogonal to main electrodes 3 and 4. The X-ray generators 30 are connected in parallel with each other, the upper ends (power source ends) thereof are connected to a switch 5, and the lower ends (grounding ends) thereof are connected to a second capacitor 2 ($C_2$) connected to the main electrodes 3 and 4 in parallel. A first capacitor 1 ($C_1$), the switch 5, two X-ray generators 30 and second capacitor 2 ($C_2$) are connected in series. Similar to the previous embodiment, the capacitance of the second capacitor 2 ($C_2$) is larger than that of the first capacitor 1 ($C_1$).

The operation of the additional embodiment now will be explained.

The first capacitor 1 ($C_1$) is firstly charged, and then the switch 5 is closed to discharge the first capacitor 1 ($C_1$). This causes sliding discharge to occur at the two X-ray generators 30 facing each other. At this moment, X-rays are emitted from sliding discharge channels 32 through faces 31 toward a main discharge region M to sufficiently preionize the laser medium in the region M. While the sliding discharge is being carried out, charges move from the first capacitor 1 ($C_1$) to the second capacitor 2 ($C_2$), thereby charging the second capacitor 2 ($C_2$). A charged voltage of the second capacitor 2 ($C_2$) is applied to the main electrodes 3 and 4 to cause main discharge, thereby performing laser oscillation.

In summary, a simple circuitry of the present invention can perform sufficient preionization. A compact auto-preionization pulse laser provided by the invention realizes a high repetition rate of laser oscillation, simple structure, low cost, high laser oscillation efficiency, and large output power.

Various modifications will become possible for those skilled in the art after receiving from the teachings of the present disclosure without departing from the scope thereof.

What is claimed is:

1. An automatic preionization pulse laser system, comprising:

a first electrode and a second electrode located to define a discharge region therebetween;

means for providing a laser medium in said discharge region;

a first capacitance connected between said electrodes;

a second capacitance connected between said electrodes;

means for accumulating an electric charge on said first capacitance; and means for discharging said electric charge accumulated on said first capacitance and transferring said electric charge to said first electrode;

said first electrode comprising a vacuum chamber, and substrate means located in said vacuum chamber and connected between said first and second capacitances to provide for transfer of said electric charge from said first capacitance to said second capacitance, said substrate means being responsive to said transfer for producing a large voltage sliding discharge to generate X-rays for preionizing said laser medium;

said second capacitance, upon said transfer of said electric charge thereto, discharging said electric charge across said electrodes to excite said laser medium to produce radiation for lasing.

2. The laser system as claimed in claim 1, wherein said substrate means comprises:

a substrate made of at least one of ferrite, ceramics, metal oxides, and a composite thereof;

a fitting member to which said substrate is fitted;

a discharge channel formed by treating a predetermined area of a surface of said substrate; and at least two sliding discharge electrodes connected to said discharge channel.

3. The laser system as claimed in claim 2, wherein said vacuum chamber is defined by:
   said first electrode;
   said fitting member; and
   a thin film for transmitting said X-rays generated by said sliding discharge.

4. The laser system as claimed in claim 3, wherein said first electrode comprises a cathode, and said second electrode comprises an anode.

5. A system as in claim 1, wherein said means for discharging comprises a switch connected between said second electrode and said first capacitance.

6. A system as in claim 1, wherein said second capacitance has a capacitance value larger than a capacitance value of said first capacitance.

7. A system as in claim 1, wherein said radiation comprises a radiation pulse.

8. A system as in claim 1, further comprising a laser resonator for receiving said radiation.

9. An automatic preionization pulse laser system, comprising:
   a first electrode and a second electrode located to define a discharge region therebetween;
   means for providing a laser medium in said discharge region;
   a first capacitance connected between said electrodes;
   a second capacitance connected between said electrodes;
   means for accumulating an electric charge on said first capacitance; and
   means for discharging said electric charge accumulated from said first capacitance and transferring said electric charge to said first electrode;
   said first electrode comprising
      a vacuum chamber,
      a pair of spaced apart terminals respectively connected to said first capacitance and said second capacitance, and
      means, coupled to one of said terminals and responsive to discharge of said electric charge from said first capacitance, for generating X-rays for preionizing said laser medium and providing for transfer of said electric charge from said first capacitance through a second of said terminals to said second capacitance, wherein said second capacitance is charged through said X-ray preionizing means;
   said second capacitance discharging said electric charge across said electrodes to excite said laser medium to produce radiation for lasing.

10. A laser system as claimed in claim 9, wherein said means for generating said X-rays comprises sliding discharge means disposed inside said vacuum chamber.

11. A laser system as claimed in claim 10, wherein said sliding discharge means comprises:
   a substrate made of at least one of ferrite, ceramics, metal oxides, and a composite thereof;
   a fitting member to which said substrate is fitted;
   a discharge channel formed by treating a predetermined area of a surface of said substrate; and
   at least two sliding discharge electrodes connected to said discharge channel.

12. A laser system as claimed in claim 11, wherein said vacuum chamber is defined by:
   said first electrode;
   said fitting member of said sliding discharge means; and
   a thin film for transmitting said X-rays.

13. A laser system as claimed in claim 12, wherein said first electrode is a cathode, and said second electrode is an anode.

14. A system as in claim 9, wherein said second capacitance has a capacitance value larger than a capacitance value of said first capacitance.

15. A system as in claim 9, wherein said radiation comprises a radiation pulse.

16. A system as in claim 9, further comprising a laser resonator for receiving said radiation.

17. An automatic preionization pulse laser system, comprising:
   means for providing a laser medium in a given region;
   a first electrode and a second electrode located in said region to define a discharge area therebetween;
   a first capacitance;
   means for placing an electric charge on said first capacitance;
   a second capacitance connected between said electrodes;
   means for connecting said first capacitance for providing for discharge of said electric charge on said first capacitance;
   means located in said region, responsive to said discharge of said electric charge for generating X-rays for preionizing said laser medium and providing for transfer of said electric charge to said second capacitance, wherein said second capacitance is charged through said X-ray preionizing means;
   said second capacitance discharging said electric charge across said electrodes to excite said laser medium to produce radiation for lasing.

18. A system as in claim 17, wherein said second capacitance has a capacitance value greater than a capacitance value of said first capacitance.

19. A system as in claim 17, wherein said means for generating X-rays produces sliding discharge to generate said X-rays and is external to said electrodes.

20. A system as in claim 17, further comprising a laser resonator for receiving said radiation.

* * * * *